April 26, 1960     K. GLÄSER     2,933,938
INDEXING TRANSMISSION FOR GEAR-WHEEL PRODUCING MACHINES
Filed May 20, 1958     3 Sheets-Sheet 1
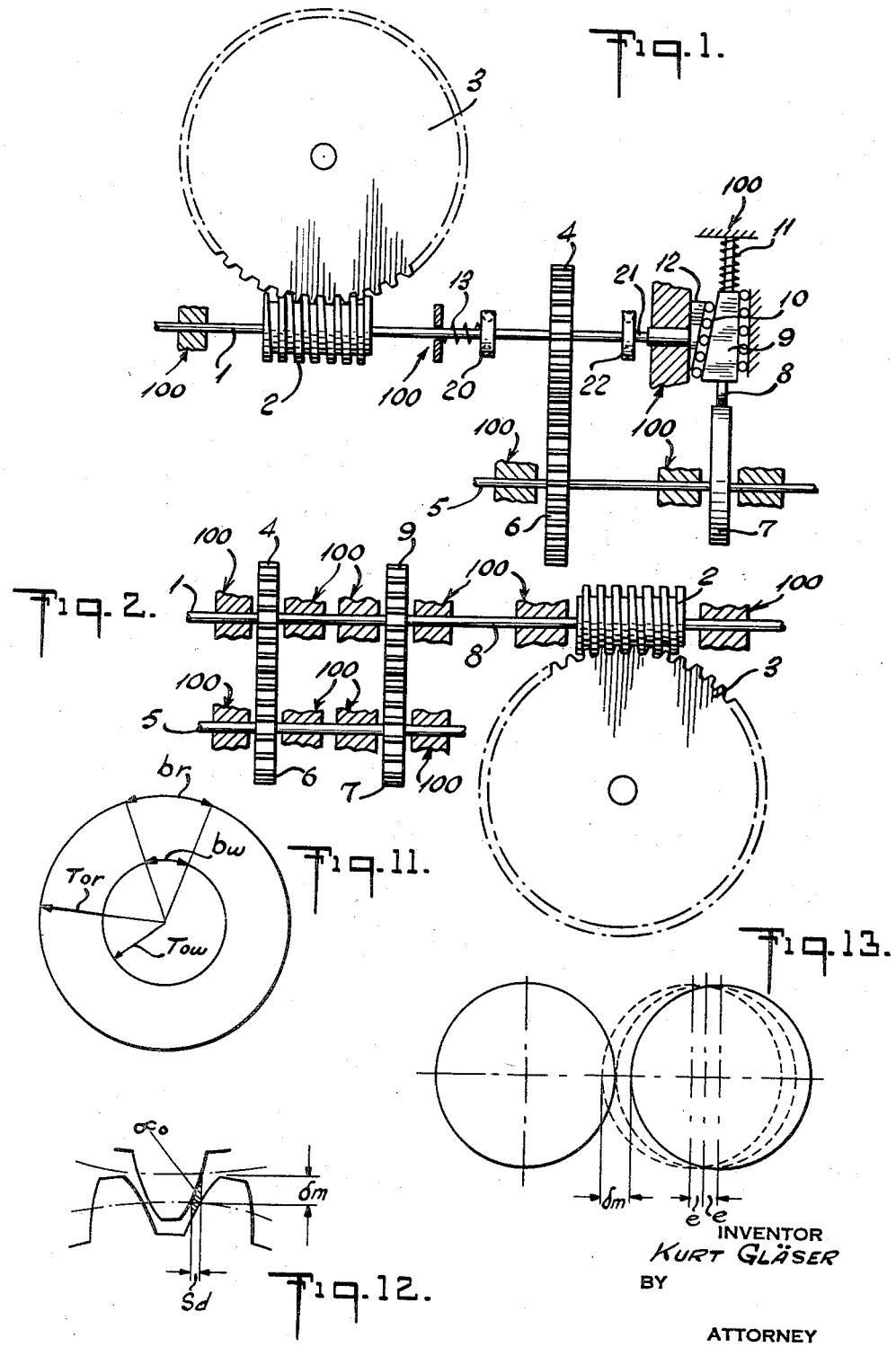
INVENTOR
KURT GLÄSER
BY
ATTORNEY April 26, 1960            K. GLÄSER            2,933,938
INDEXING TRANSMISSION FOR GEAR-WHEEL PRODUCING MACHINES
Filed May 20, 1958                                     3 Sheets-Sheet 2
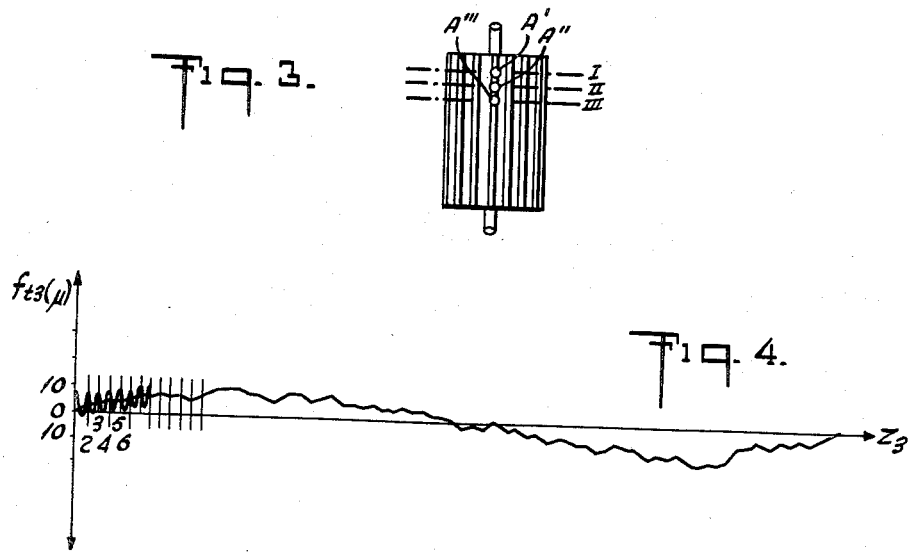
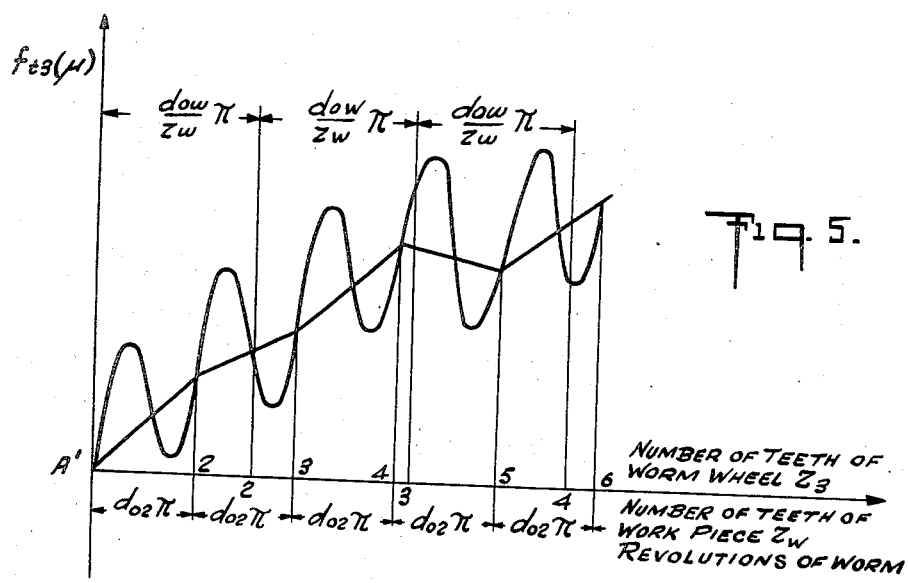
INVENTOR
*KURT GLÄSER*
BY
ATTORNEY

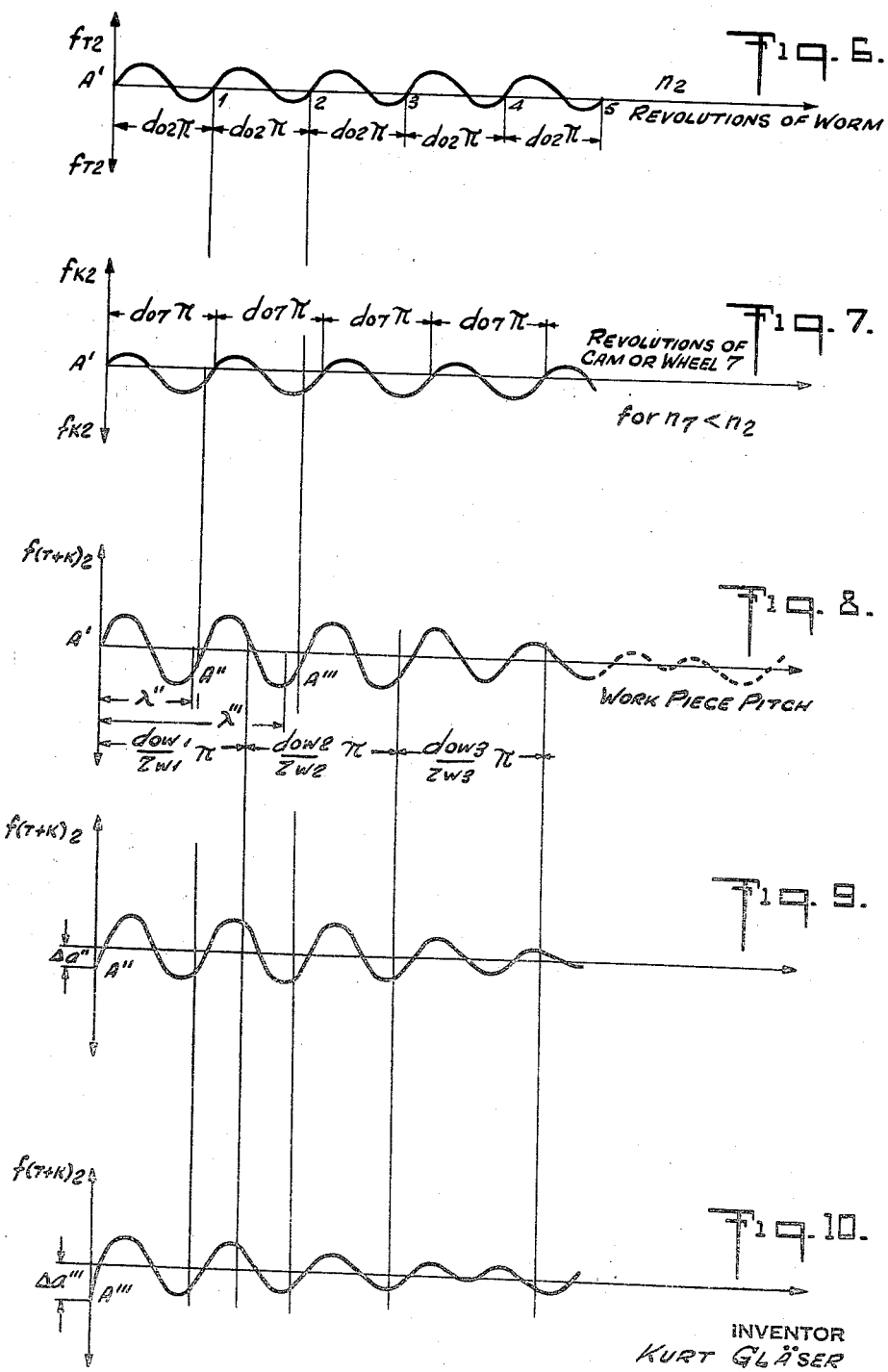

United States Patent Office

2,933,938
Patented Apr. 26, 1960

2,933,938
INDEXING TRANSMISSION FOR GEAR-WHEEL PRODUCING MACHINES

Kürt Gläser, Karl-Marx-Stadt, Germany, assignor to Institut für Werkzeugmaschinen, Karl-Marx-Stadt, Germany Application May 20, 1958, Serial No. 736,545

Claims priority, application Germany May 28, 1957

5 Claims. (Cl. 74—425.5)

The invention relates to gear transmissions, and particularly to an indexing transmission for a gear-wheel-producing machine such as a gear hobbing machine.

When spur gears, worm gears, and the like are to be produced on a precision gear hobbing machine, lead or pitch errors in lead screws or other actuating devices cause cyclic alternating errors in the feed rate and in the indexing movement of the work support. Various attempts have already been made to compensate for such errors. A measure of success has been achieved in reducing the magnitude of the indexing error, but the residual small cyclic irregularities in a gear wheel produced with the aid of such known compensating devices are located in the same axial plane. When such a gear wheel becomes part of a high speed transmission, it will still cause substantial vibrations and gear noise.

An object of the invention is the provision of an indexing transmission in a gear hobbing machine for producing gear wheels which will run substantially without noise and without vibration.

It is another object of the invention to provide a device for indexing work pieces in a gear hobbing machine and the like for producing gear wheels the residual irregularities of which are not located in the same axial plane.

In its more specific aspects the invention provides a transmission in which a cyclic alternating movement of an amplitude substantially the same as that of the cyclic alternating error but of fractionally different frequency is generated and superposed on the cyclic alternating indexing error, whereby the residual small cyclic irregularities due to the indexing error are distributed over the surface of the work piece in a helical path.

Other objects and features of the invention will become apparent to those skilled in the art as the disclosure is made in the following detailed description of preferred embodiments of the invention as illustrated in the accompanying drawings in which Fig. 1 is a diagrammatic view in top plan of an embodiment of the index drive of the invention in its application to a gear hobbing machine, Fig. 2 is a diagrammatic view in top plan of another embodiment of the index drive of the invention, Fig. 3 illustrates a side elevation of a spur gear, Fig. 4 is an error diagram of the indexing movement of a representative gear hobbing machine, Fig. 5 shows an enlarged detail of Fig. 4, Fig. 6 is a diagram of the drunkenness error of a representative worm index drive, Fig. 7 is a diagram of supplemental index gear movement according to the invention, Fig. 8 is a diagram of the total error produced by superposition of the drunkenness error of Fig. 6 and the supplemental gear movement of Fig. 7, Fig. 9 is a diagram of the total error according to Fig. 8 after one additional revolution of the work piece, Fig. 10 is a diagram of the total error according to Fig. 8 after two additional revolutions of the work piece, Fig. 11 is a diagram illustrating the indexing error as a function of the ratio of the diameters of the worm wheel and of the work piece, Fig. 12 is a diagram illustrating the back lash of a gear of a pair of gears as a function of the variation of axial distance, and Fig. 13 is a diagram illustrating the relationship of variation in axial distances and excentricity in the intermediate gearing of the invention.

Referring now to the drawings, wherein like reference characters designate like or corresponding parts throughout in the several views, there is shown in Fig. 1 which diagrammatically illustrates a preferred embodiment of the invention a drive shaft 1 for the indexing transmission of a gear hobbing machine which is geared to the main drive of the machine in a well-known manner and which is journaled in the frame of the machine generally designated as 100. A worm 2 is fixedly mounted on shaft 1 and engages a worm wheel 3 for indexing movement. The workpiece (not shown) is fastened to a support integral with or fixed to worm wheel 3 for joint rotary movement as it is worked upon by gear cutting or hobbing tools. Shaft 1, furthermore, is provided with a shoulder 20 formed by a ball bearing which is urged towards the right by a helical spring 13. A spur gear 4 is fixedly mounted on shaft 1 and engages a spur gear 6 mounted on an intermediate shaft 5 which carries a cam disk 7. A cam follower 8 is fixedly connected to a wedge 9 which is urged towards cam disk 7 by a compression spring 11. Wedge 9 is slidably supported in the machine frame 100 and cooperates with a second wedge 12 which is fastened to one end of a pin 21 slidably supported in the frame 100 and rotatably linked by its free end to shaft 1 by means of a roller-bearing coupling 22. Wedge 12 is thus urged into contact with the inclined surface 10 of wedge 9 by the pressure of spring 13.

The device of Fig. 1 operates as follows:

Movement of shaft 1 causes cam 7 to rotate by the coaction of gears 4 and 6 which have a slightly different number of teeth so that their transmission ratio is fractionally different from 1. Wedge 9 is thus made to reciprocate and to impart to shaft 1 an axial reciprocating movement by means of wedge 12 and pin 21. The frequency of the reciprocating movement of shaft 1 is fractionally different from the rotational speed thereof. The movement of worm 2 is thus both rotary and axial, the two movements being of fractionally different frequency.

The effects produced by this device will now be illustrated by a specific example.

*Example 1*

Worm wheel 3 of a single thread index drive as shown in Fig. 1 has 72 teeth, gear 4 has 69 teeth and a gear 6 has 71 teeth. Any residual small irregularity along the pitch line of a gear wheel produced from a work piece with the aid of the index drive of the invention and due to indexing error will recur in the same axial plane of the gear wheel only when the number of revolutions of the worm wheel, and thereby of the work piece, a simple fraction of the number of revolutions of gear 6.

The transmission ratio between the work piece and wheel 6 is $$n_6/n_3 = \frac{Z_3 \cdot Z_4}{Z_2 \cdot Z_6}$$

and $$n_6 = n_3 \cdot \frac{Z_3 \cdot Z_4}{Z_2 \cdot Z_6} = n_3 \cdot \frac{72 \times 69}{1 \times 71} = n_3 \frac{4968}{71}$$

wherein $n$ is the number of revolutions, $Z$ is the number of teeth, and the subscripts identify the various gear wheels.

It appears then from the above calculation that the cyclic irregularity will reappear in the same radial position on the work piece after gear wheel 6 has performed 4,968 revolutions and the worm wheel 3 with the work piece has performed 71 revolutions. If it is assumed that the rate of feed of the gear cutting hob be 1 mm. for each revolution of the work piece, the same pattern of irregularity will recur on the same tooth at an axial distance of 71 mm.

If the gradient of wedges 9, 12 is 1:400 and if the drunkenness error of the worm drive is partly compensated for by suitable configuration of cam 7, the drunkenness error being magnified on cam 7 by a ratio of 1:400, then for a drunkenness error of the worm drive of 0.0025 mm., cam 7 will be a circular disc being mounted on shaft 5 excentrically by an eccentricity of 0.5 mm.

The indexing error of a gear hobbing machine not equipped with a compensating device or equipped with a compensating device adapted only to keep the angular speed of the work piece relatively constant, will vary in the manner diagrammatically illustrated in Figs. 4 and 5. The error $f_{t3}$ (in microns) will vary cyclically in such a manner that it would cause irregularities of the same magnitude on a work piece (Fig. 3) in any one of a number of radial reference planes I, II, III at the same distance from the points of intersection A', A'', A''', of these radial planes with an axial reference plane.

High frequency noise in a gear drive is due to the periodic pitch errors in the indexing worm 2 of the gear producing machine which are illustrated diagrammatically in Fig. 6 not taking into account the accumulated error of the worm wheel indexing.

Because of the difference in speed of rotation between shaft 1 and cam 7, the worm 2 is given a supplemental axial movement diagrammatically illustrated in Fig. 7 so that the error movement of the worm wheel 3 is represented in Fig. 8 as the total obtained by superposition of the errors of Figs. 6 and 7, the frequency of the total error curve being different from the frequency of the two parent curves because of interference effects.

When the work piece has performed a full revolution and the tool has been advanced from point A' on the surface of the work piece illustrated in Fig. 3 to point A'' in plane II, the error curve is shifted by the amplitude difference $\Delta a''$ because of the phase shift $\lambda''$ (Fig. 9).

Fig. 10 illustrates the course of the error curve starting from point A''' and proceeding in plane III. The phase shift has now increased to $\lambda'''$ causing an amplitude difference of $\Delta a'''$.

The error curve will thus be continuously shifted and will not return to its original position until the number of rotations of the work piece is a simple fraction of the number of rotations of cam 7 whereupon the phase shift will start again.

The transmission ratio of coacting gears 4 and 6 and the shape of cam 7 have to be selected in such a manner that the worm wheel 3 is continuously accelerated or decelerated in such a manner that the same pattern of irregular rotation will recur only after a large number of revolutions. The index drive of the invention will thus produce indexing errors of the same magnitude in the work piece lying not in an axial plane but in a helical path spiraling over the surface of the gear wheel produced.

The embodiment of the invention illustrated in Fig. 2 employs the intermediate gearing itself to produce a supplemental cyclic indexing variation of a frequency different from the cyclic indexing error inherent in the machine.

Fig. 2 shows a drive shaft 1, an intermediate shaft 5 and a driven shaft 8 journaled in bearings in the frame 100 of a gear hobbing machine. A spur gear 4 is fixedly mounted on shaft 1 and engages a spur gear 6 mounted on shaft 5 which also carries a gear spur 7. Gear 7 is in engagement with a spur gear 9 fixedly mounted on driven shaft 8 which carries the worm 2 for actuating the worm wheel 3 which is connected with the work piece in the usual manner for indexing movement thereof. The transmission ratio of gears 4 and 6 is close to, but different from 1. The transmission ratio of paired gears 7 and 9 is the same as, but opposite to that of gears 4, 6. The overall transmission ratio of the intermediate gearing thus is 1. Worm 2 thus rotates at the same basic speed as drive shaft 1. The gear 7 is mounted slightly eccentrically on shaft 5.

The eccentricity of gear wheel 7 which rotates at a speed slightly different from that of worm 2 imparts supplemental acceleration or deceleration to worm wheel 3, the supplementary speed variation being superposed on the indexing error and thus causing any specific error amplitude to travel in a helical path over the surface of the workpiece produced rather than to recur in the same axial plane.

The operation of the device of Fig. 2 will be more fully appreciated from a specific example.

*Example 2*

Let it be assumed that wheel 3 again has 72 teeth and a single thread and that gear wheels 9 and 7 have 69 and 71 teeth respectively. The pattern of error will then recur only after that number of revolutions of the work piece that are a simple fraction of the number of revolutions of wheel 7.

The transmission ratio of the work piece connected to wheel 3 and of the wheel 7 is $$n_7/n_3 = \frac{Z_3 \cdot Z_9}{Z_2 \cdot Z_7}$$

and $$n_7 = n_3 \cdot \frac{Z_3 \cdot Z_9}{Z_2 \cdot Z_7} = n_3 \cdot \frac{72 \times 69}{1 \times 71} = n_3 \cdot \frac{4968}{71}$$

wherein $n$ is the number of revolutions, $Z$ is the number of teeth, and the subscripts identify the various wheels.

The cyclic irregularity will thus reappear in the same radial position on the work piece after 4,968 revolutions of wheel 7 and 71 revolutions of the work piece and will progress over the surface of the work piece in a helical path.

If the velocity of relative feed of tool and work piece is $V_s$ mm. per revolution of the work piece, the feed length S between irregularities lying in the same axial plane will be $$S = n_3 V_s = 71 \text{ mm. (for } V_s = 1 \text{ mm.)}$$

and the number H of identical irregularities in any given width $b$ of a work piece is $$H = \frac{b}{S}$$

The necessary eccentricity of gear wheel 7 is derived from the following calculations:

As shown in Fig. 11, the relationship between the pitch circle radii of work piece ($r_{ow}$) and index gear ($r_{oT}$) is $$\frac{b_w}{r_{ow}} = \frac{b_T}{r_{oT}}$$

and therefore $$b_T = b_w \cdot \frac{r_{oT}}{r_{ow}}$$

wherein $$r_{ow} = \frac{Z_w \cdot m_w}{2}$$

and the partial rotation $\Delta \varphi$ of the worm necessary for shifting the location of the irregularity is obtained from the ratio $$\frac{360}{t_s} = \frac{\Delta \varphi}{b_T}$$

wherein the pitch of the worm is $$t_s = m_s \cdot \pi$$

wherefore $$\Delta \varphi = \frac{360}{t_s} \cdot b_T = \frac{360}{t_s} \cdot b_w \cdot \frac{r_{oT}}{r_{ow}}$$

If the work piece rotation $b_w$ is set to be equal to the indexing error $f_t$ which is produced by the drunkenness error $f_T$ of the worm, one obtains $$\Delta \varphi = \frac{360 \cdot r_{oT}}{t_s \cdot r_{ow}} \cdot f_t$$

The necessary eccentricity $\partial m$ of the eccentrically supported gear 7 is then obtained from Fig. 12, $\alpha_0$ being the pressure angle, and $s_d$ the clearance between the sides of the teeth $$tg\alpha_0 = \frac{s_d}{2.\partial.m}$$

and $$s_d = \partial m \cdot 2 \cdot tg\ \alpha_0$$

wherein $\partial m = 2e$ (Fig. 13) the clearance $s_d$ for causing angular motion $\Delta \varphi$ of the worm is thus $$s_d = \frac{\Delta \varphi \cdot 2 \cdot r_{oe} \cdot \pi}{360} \text{ from the relationship } \frac{360}{2r_{oe}\pi} = \frac{\Delta \varphi}{s_d}$$

wherein $r_{oe}$ is the pitch circle radius of the eccentrically mounted gear wheel 7.

The following equation is then obtained by substituting for $\Delta \varphi$ $$s_d = \frac{\pi}{t_s} \cdot \frac{r_{oT} \cdot 2 \cdot r_{oe}}{r_{ow}} \cdot f_t$$

The shift in the location of the axis is obtained therefrom as being $$\partial m = \frac{\pi}{t_s} \cdot \frac{r_{oT} \cdot r_{oe}}{tg\alpha_0 \cdot r_{ow}} \cdot f_t$$

and the eccentricity $$e = \frac{\pi}{2t_s} \cdot \frac{r_{oT} \cdot r_{oe}}{tg\alpha_0 \cdot r_{ow}} \cdot f_t$$

The following numerical example is illustrative of the calculation:

The pitch of the worm wheel $$t_s = m_s \cdot \pi = 4.5\ \pi = 14.13 \text{ mm.}$$

The pitch cycle radius of the index wheel 3

$$r_{oT} = \frac{Z_3 \cdot m_s}{2} = \frac{72 \times 4.5}{2} = 162 \text{ mm.}$$

The pitch circle radius of gear wheel 7

$$r_{oe} = \frac{Z_7 \cdot m}{2} = \frac{71 \times 2}{2} = 71 \text{ mm.}$$

The pitch circle radius of the work piece $$r_{ow} = \frac{Z_w \cdot m}{2} = \frac{46 \times 4}{2} = 92 \text{ mm.}$$

The magnitude of the required eccentricity then is $$e = \frac{\pi}{2 \times 14.13} \cdot \frac{162 \times 71}{0.364 \times 92} \cdot f_t \approx 38.5 \times f_t$$

For an indexing error $f_t$ of 0.005 mm. an eccentricity of approximately 0.2 mm. would be required under the given conditions.

Such an eccentricity will be sufficient for shifting the location of the irregularities, but will not interfere with the proper meshing of the gears.

It should be understood of course that the foregoing disclosure relates only to preferred embodiments of the invention and that it is intended to cover all changes and modifications of the examples of the invention herein chosen for the purpose of the disclosure which do not constitute departure from the spirit and scope of the invention set forth in the appended claims.

What is claimed is:

1. In the indexing transmission of a gear-producing machine having a rotatable work support and index gearing for actuating rotary indexing movement of said work support, said gearing including a worm wheel fixedly connected to said work support for joint rotary movement, and a worm meshing said worm wheel for imparting rotary movement thereto, a device for compensating for cyclic alternating error movements of said index gearing, comprising axially shiftable drive shaft means having said worm fixedly fastened thereto, first gear means mounted on said drive shaft means, intermediate shaft means, second gear means mounted on said intermediate shaft means for meshing engagement with said first gear means, the transmission ratio of said first and said second gear means being fractionally different from 1, cam means fixedly mounted on said intermediate shaft means, and cam follower means coacting with said cam means for imparting axial reciprocating movement to said drive shaft means.

2. In the indexing transmission of a gear-producing machine having a rotatable work support and index gearing for actuating rotary indexing movement of said work support, said index gearing including a worm wheel fixedly connected to said work support for joint rotary movement, and a worm meshing said worm wheel for imparting rotary movement thereto, a device for compensating for cyclic alternating error movements of said index gearing, comprising first shaft means, first gear means fixedly and fractionally eccentrically mounted on said shaft means, second shaft means, second gear means mounted on said second shaft means for meshing engagement with said first gear means, said worm being mounted on said second shaft means for joint rotary movement with said second gear means.

3. An indexing drive for a gear wheel manufacturing machine including a rotatable work support comprising driven gear means connected to said work support, driving gear means in operative engagement with said driven gear means, and means for accelerating and decelerating said driving gear means in substantially opposite direct proportion to the normal lead and pitch cyclic driving errors of the operation of said driving and driven gear means whereby to compensate for such errors, said means for cyclically accelerating and decelerating said driving gear means including a driving gear shaft, an input shaft, means to continuously rotate said input shaft, and a plurality of gears connecting said input shaft with said driving gear shaft, at least one of said gears being slightly eccentrically mounted to effect opposite direct proportional movement of said driving gear means in an amount to compensate for said cyclic driving errors.

4. An indexing drive for a gear wheel manufacturing machine including a rotatable work support comprising driven gear means connected to said work support, driving gear means in operative engagement with said driven gear means, and means for accelerating and decelerating said driving gear means in substantially opposite direct proportion to the normal lead and pitch cyclic driving errors of the operation of said driving and driven gear means whereby to compensate for such errors, said means for accelerating and decelerating said driving gear means including at least one eccentrically mounted gear.

5. An indexing drive for a gear wheel manufacturing machine including a rotatable work support comprising driven gear means connected to said work support, driving gear means in operative engagement with said driven gear means, and means for accelerating and decelerating said driving gear means in substantially opposite direct proportion to the normal lead and pitch cyclic driving errors of the operation of said driving and driven gear means whereby to compensate for such errors, said driving gear accelerating and decelerating means including intermediate gearing having a transmission ratio fractionally different from one.

References Cited in the file of this patent

UNITED STATES PATENTS

| | | |
|---|---|---|
| 2,098,132 | Bucholtz | Nov. 2, 1937 |
| 2,237,108 | Nichols | Apr. 1, 1941 |
| 2,585,971 | Sloane | Feb. 19, 1952 |
| 2,877,658 | Anthony | Mar. 17, 1959 |